United States Patent
Wagner et al.

(10) Patent No.: US 8,286,992 B2
(45) Date of Patent: Oct. 16, 2012

(54) AIRBAG DEVICE FOR A MOTOR VEHICLE

(75) Inventors: Udo Wagner, Rüsselsheim (DE); Ulrich Rick, Roxheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 171 days.

(21) Appl. No.: 12/827,770

(22) Filed: Jun. 30, 2010

(65) Prior Publication Data

US 2010/0327565 A1    Dec. 30, 2010

(30) Foreign Application Priority Data

Jun. 30, 2009  (DE) .......................... 10 2009 031 120

(51) Int. Cl.
*B60R 21/205* (2011.01)
*B60R 21/217* (2011.01)
(52) U.S. Cl. ..................................... 280/728.2; 280/732
(58) Field of Classification Search ............... 280/728.2, 280/732, 741; *B60R 21/205, 21/217*
See application file for complete search history.

(56) References Cited

U.S. PATENT DOCUMENTS

| | | | |
|---|---|---|---|
| 5,087,067 A | | 2/1992 | Seki et al. |
| 5,135,252 A | * | 8/1992 | Suran et al. .................. 280/732 |
| 5,217,254 A | * | 6/1993 | Satoh ........................... 280/732 |
| 5,263,739 A | * | 11/1993 | Webber et al. ............. 280/728.2 |
| 5,351,987 A | * | 10/1994 | Donegan et al. ........... 280/728.2 |
| 5,427,406 A | * | 6/1995 | Zushi et al. ................. 280/728.2 |
| 5,433,472 A | * | 7/1995 | Green et al. ................ 280/728.2 |
| 5,458,363 A | * | 10/1995 | Garner et al. .............. 280/728.1 |
| 5,620,201 A | | 4/1997 | Ricks |
| 5,658,009 A | * | 8/1997 | Saderholm ................. 280/728.2 |
| 5,730,459 A | * | 3/1998 | Kanda ............................ 280/731 |
| 5,782,481 A | * | 7/1998 | Magoteaux ................ 280/728.2 |
| 5,988,675 A | * | 11/1999 | Bathon et al. ................. 280/732 |
| 6,231,068 B1 | | 5/2001 | White, Jr. et al. |
| 6,247,721 B1 | * | 6/2001 | Lang ......................... 280/728.2 |
| 6,460,874 B1 | * | 10/2002 | McDonnell et al. ....... 280/728.2 |
| 6,536,802 B1 | | 3/2003 | Sutherland et al. |
| 6,543,802 B1 | * | 4/2003 | Uchiyama et al. ......... 280/728.2 |
| 6,942,244 B2 | * | 9/2005 | Roychoudhury .......... 280/728.3 |
| 6,983,954 B2 | * | 1/2006 | Sakaguchi ................. 280/728.2 |

(Continued)

FOREIGN PATENT DOCUMENTS

DE  19705830 C1  8/1998

(Continued)

OTHER PUBLICATIONS

British Patent Office, British Search Report for British Application No. GB1008262.6, Sep. 7, 2010.

*Primary Examiner* — Paul N Dickson
*Assistant Examiner* — Laura Freedman
(74) *Attorney, Agent, or Firm* — Ingrassia Fisher & Lorenz, P.C.

(57) ABSTRACT

An airbag device is provided for a motor vehicle. The airbag device includes, but is not limited to a carrying part on the motor vehicle side and an airbag module of an inflatable, folded gas bag fastened to the carrying part and a gas generator for inflating the gas bag. The carrying part includes, but is not limited to a fastening section to which the airbag module is detachably mounted. The airbag module is fastened to the fastening section of the carrying part via a link guide.

15 Claims, 3 Drawing Sheets

U.S. PATENT DOCUMENTS

| | | | |
|---|---|---|---|
| 7,195,273 B2 * | 3/2007 | Lewis et al. | 280/728.2 |
| 7,216,892 B2 * | 5/2007 | Baumbach et al. | 280/728.2 |
| 7,900,955 B2 * | 3/2011 | Kobayashi et al. | 280/728.2 |
| 2001/0015549 A1 | 8/2001 | Yamaji et al. | |
| 2002/0153714 A1 | 10/2002 | Kreuzer | |
| 2007/0164542 A1 | 7/2007 | Matura et al. | |
| 2008/0007037 A1 * | 1/2008 | Sauer | 280/743.1 |
| 2008/0111351 A1 | 5/2008 | Eckert et al. | |

FOREIGN PATENT DOCUMENTS

| | | |
|---|---|---|
| DE | 29812800 U1 | 11/1998 |
| DE | 10163686 A1 | 7/2003 |
| DE | 10203286 A1 | 8/2003 |
| DE | 10346012 A1 | 7/2004 |
| DE | 202004005023 U1 | 7/2004 |
| DE | 202004020096 U1 | 3/2005 |
| DE | 102004023680 A1 | 12/2005 |
| DE | 102006057503 A1 | 6/2008 |
| FR | 2696392 A1 | 4/1994 |
| FR | 2851532 A1 | 8/2004 |
| JP | 2002053002 A | 2/2002 |
| JP | 2004114987 A | 4/2004 |
| KR | 20060133102 A | 12/2006 |
| KR | 100803306 B1 | 2/2008 |
| WO | 02055345 A1 | 7/2002 |

* cited by examiner

AIRBAG DEVICE FOR A MOTOR VEHICLE

CROSS-REFERENCE TO RELATED APPLICATION

This application claims priority to German Patent Application No. 102009031120.3, filed Jun. 30, 2009, which is incorporated herein by reference in its entirety.

TECHNICAL FIELD

The present invention relates to an airbag device for a motor vehicle with a carrying part on the motor vehicle end and an airbag module fastened to the carrying part of an inflatable, folded gas bag and a gas generator for inflating the gas bag, wherein the carrying part comprises a fastening section to which the airbag module is detachably fastened.

BACKGROUND

From DE 10 2006 057 503 A1 an airbag device for a motor vehicle is known. The airbag device disclosed therein comprises a carrying part on the motor vehicle end in form of an instrument panel. In addition, the airbag device comprises an airbag module fastened to the instrument panel. The airbag module substantially consists of an inflatable, folded gas bag and a gas generator for inflating the gas bag. In addition, the carrying part on the motor vehicle end comprises a fastening section that is formed by a part of a chute housing connected to the carrying part, and the airbag module, the gas generator of the airbag module to be precise, is detachably fastened to the fastening section of the chute housing with the help of a screw connection.

The known airbag device has proved itself insofar as it has a particularly low weight that is particularly attributable to the absence of a separate and rigid airbag housing from the airbag module. It has been shown however that the assembly of the known airbag device particularly the attachment of the airbag module to the fastening section of the carrying part is harder.

Accordingly, it is at least one object to create an airbag device for a motor vehicle which on the one hand is a lightweight design and on the other hand can be particularly easily mounted. In addition, other objects, desirable features, and characteristics will become apparent from the subsequent summary and detailed description, and the appended claims, taken in conjunction with the accompanying drawings and this background.

SUMMARY

The airbag device according to an embodiment of the invention is designed for a motor vehicle and comprises a carrying part on the motor vehicle end. The carrying part on the motor vehicle end can for example be a part of the body, an interior trim component, a vehicle pillar, a roof frame, a cross member, an instrument panel, a support frame, a steering wheel or the like. The airbag device further comprises an airbag module that is or can be fastened to the previously mentioned carrying part. The airbag module comprises at least one inflatable, folded gas bag and a gas generator for inflating the gas bag, and preferentially a rigid airbag housing is omitted in order to achieve a particularly low weight of the airbag device. A section of the carrying part is designed as fastening section to which the airbag module is or will be detachably fastened. This fastening section can for example be designed in the shape of a wall or/and as section of a chute housing of the carrying part. The airbag is fastened to the fastening section of the carrying part via a link guide.

In contrast with the solution known from DE 10 2006 057 503 A1, the airbag module in accordance with an embodiment of the invention is thus not connected to the fastening section of the carrying part via a screw connection, a clip connection or a clasp-eye connection but rather via a link guide to which the fastening section is fastened. Thus the link guide for fastening the airbag module to the fastening section makes it possible that on the one hand particularly secure insertion of the airbag module in the fastening position and on the other hand secure supporting of the airbag module in the fastening position are possible. In this manner, mounting can be performed securely and in a shorter time without losing the advantages already known from DE 10 2006 057 503 A1.

In a preferred embodiment of the airbag device, the link guide on the one hand comprises at least one link and on the other hand at least one protruding shoulder that can be inserted in the link and is positively guided along the link. With this embodiment it is initially immaterial if the link is provided on the fastening section or the airbag module, although it is preferred if the link is provided on the fastening section, while the protruding shoulder is arranged on the airbag module, as will be explained later on. With this embodiment it is preferred if the link is formed by a groove or a web. However, it has proved to be particularly advantageous if the link is formed by a groove or a web. It has proved to be particularly advantageous; however, if the link is formed by a groove, more preferably if this groove is provided in the fastening section. Through the groove-shaped configuration of the link particularly simple mounting is possible, more so since the groove-shaped configuration allows simpler monitoring of the working area during the mounting. It is furthermore particularly preferred with this embodiment if the at least one protruding shoulder is designed mushroom-shaped, more so since secure engaging behind the edge of the link is possible, which results in a particularly secure fastening of the airbag module to the fastening section via the link guide.

As already hinted, the link guide in a further preferred embodiment of the airbag device is provided on the fastening section, while the protruding shoulder is provided on the airbag module, for example on the gas generator of the airbag module. It has been shown that with this embodiment the protruding shoulder on the side of the airbag module can be more simply inserted in the link on the side of the fastening section than would be the case with the reverse arrangement, as a result of which the mounting of the airbag device is further simplified.

In an advantageous embodiment of the airbag device, the link comprises an entry section via which the protruding shoulder can be inserted in the link, and a bag section on the end following thereupon, and the bag section runs at an angle to the entry section. With this embodiment the bag section on the end can follow the entry section of the link both directly and indirectly. In that the bag section runs at an angle to the entry section a particularly secure hold or a particularly secure support of the airbag module on the fastening section is possible via the link guide. With this embodiment it is further preferred if the bag section runs transversely, particularly preferred at a right angle to the entry section in order to achieve the advantages mentioned at the outset. By this it is also achieved that on inserting the protruding shoulder in the link, a clear distinction can be made between the initial inserting and the continued guiding of the airbag module into its fastening position, in which the protruding shoulder preferentially strikes the end of the bag section. Thus, particularly secure mounting of the airbag module in its fastening position is achieved.

According to a further advantageous embodiment of the airbag device, the carrying part comprises a chute housing for forming a chute for the aimed unfolding of the gas bag in an exit direction, wherein the chute housing is preferentially formed in one piece with the carrying part, although subsequent fastening of the chute housing to the carrying part is also possible. With this embodiment the airbag module is at least partially arranged within the chute housing or within the chute at least partially enclosed by the chute housing, and the previously mentioned fastening section is formed as part of the chute housing. As already mentioned at the outset, the fastening section in this case is preferentially designed as a wall-shaped section of the chute housing. With this embodiment it is furthermore preferred if the carrying part is designed as interior trim component, that is for example as instrument panel.

In a particularly preferred embodiment of the airbag device, the bag section of the link runs transversely, preferentially at a right angle to the exit direction in order to guarantee a particularly secure hold of the airbag module on the fastening section even when the gas generator is ignited and the gas bag unfolds in exit direction. With this embodiment it is furthermore preferred if the entry section of the link runs parallel to the exit direction of the gas bag or/and to the inserting direction of the airbag module. In that the entry section of the link runs parallel to the exit direction of the gas bag or/and to the inserting direction of the airbag module, particularly simple inserting of the airbag module in the chute of the chute housing is possible, while the bag section running transversely or at a right angle to the exit direction makes possible secure supporting of the airbag module on the fastening section.

According to a further preferred embodiment of the airbag device, the link guide is provided on the gas generator of the airbag module on the one hand and the fastening section of the carrying part on the other hand. This means that the link guide is composed of parts on the gas generator side, such as for example the link or the protruding shoulder, and parts on the fastening section side, such as for example the protruding shoulder or the link. This embodiment is an advantage to the extent that the link or the protruding shoulder can be formed particularly simply and sturdily on the gas generator of the airbag module. With this embodiment it is furthermore preferred if the protruding shoulder is directly provided on the gas generator, while the link is formed on the fastening section. As already hinted before, the protruding shoulder can be more simply inserted in the link so that mounting of the airbag device is simplified.

In a further advantageous embodiment of the airbag device, the gas generator comprises a connecting part for connecting an ignition cable so that the gas generator can be ignited via the ignition cable and the connecting part on the gas generator end. Here, the connecting part is accessible at least via a clearance in the fastening section so that simple connecting of the ignition cable is possible, more so since the ignition cable can then be routed to the connecting part from the outside in a particularly simple manner. In doing so it has proved to be particularly advantageous if the mentioned connecting part extends to the outside through a clearance in the fastening section in order to make possible simple connecting of the ignition cable. Independent of the chosen version the connecting part is preferentially formed in such a manner that together with a connecting part of the ignition cable it forms a plug connection which can be created in a particularly simple manner.

According to a further preferred embodiment of the airbag device, the airbag module comprises a flexible protective envelope at least partially enveloping the gas bag or/and gas generator, which is fastened to the chute housing of the carrying part. Here, the chute in part is limited by the chute housing and in part by the protective envelope so that preferentially a closed chute exists. In that the chute in part is limited by the protective envelope it is no longer required to provide a chute housing which completely limits the chute so that the chute housing merely needs to be present rudimentarily and a low weight of said chute housing can be achieved without the function of the chute housing, namely making possible aimed unfolding of the gas bag. The latter is due to the function of the chute housing being partly taken over by the substantially lighter protective envelope of the airbag module.

According to a particularly advantageous embodiment of the airbag device, the chute housing comprises an exit opening for the unfolding gas bag which is covered by a cover having a predetermined tearing line. In order to fulfill the function assigned to the flexible protective envelope in the abovementioned embodiment particularly securely the tear strength of the protective envelope fastened to the chute housing is preferentially greater than the tear strength of the predetermined tearing line of the cover for the exit opening of the chute housing. Although the term predetermined tearing line is mentioned here as well as before and in the following, this can alternatively also be described as predetermined breaking line.

As already described above making reference to an embodiment of the airbag device, the link guide can be provided on the gas generator of the airbag module on the one hand and the fastening section of the carrying part on the other hand. In an alternative embodiment, the link guide is provided on the previously mentioned flexible protective envelope of the airbag module on the one hand and the fastening section of the carrying part on the other hand. A more flexible arrangement of the gas generator of the airbag module within the chute or relative to the fastening section of the carrying part is possible in this manner. Here it is preferred if the protruding shoulder of the link guide is directly arranged on the protective envelope while the link of the link guide is provided on the fastening section in order to make possible the simple mounting of the airbag module to the fastening section of the carrying part already mentioned before.

In a further particularly preferred embodiment of the airbag device according to the invention, which is based on the previously described embodiment, the gas generator is fastened to the protective envelope. Here, the fastening of the gas generator can basically be effected in any manner whatsoever, while the gas generator is preferentially fastened to the protective envelope by screwing. With this embodiment it is also preferred if the gas generator comprises a connecting part for connecting an ignition cable that is accessible via a clearance in the protective envelope or/and extends to the outside through a clearance in the protective envelope in order to be able to particularly simply connect the gas generator to the ignition cable, as has already been explained before.

In a further advantageous embodiment of the airbag device, the gas generator based on at least one direction is arranged transversely to the exit direction of the gas bag in the middle within the chute, which has a positive effect on the unfolding behavior of the gas bag. This embodiment can be more preferably realized if the link guide is provided between the protective envelope of the airbag module on the one hand and the fastening section of the carrying part on the other hand, while the gas generator is fastened to the protective envelope and thus only indirectly to the fastening section of the carrying part via the protective envelope.

In a further preferred embodiment of the airbag device, the gas generator is formed cylindrically with a longitudinal axis which extends transversely or parallel to the exit direction of the gas bag. Thus, it is preferred here if the gas generator extending transversely to the exit direction of the gas bag is directly fastened to the fastening section of the carrying part via the link guide. On the other hand it is preferred with this embodiment if the gas generator extending parallel to the exit direction of the gas bag is fastened to the protective envelope, while the protective envelope in turn is connected to the fastening section of the carrying part via the link guide in the manner described before. It has also proved to be advantageous independently of the selected embodiment version if the gas generator is not tubular, as is usually the case, but can-shaped in order to make possible a space-saving and light-weight arrangement on the one hand and an expansive arrangement of the inflatable, folded gas bag on the other hand.

According to a further preferred embodiment of the airbag device, the length of the can-shaped gas generator is smaller than its outer diameter, wherein the length of the can-shaped gas generator is preferentially a maximum of half, particularly preferred a maximum of a third of the outer diameter. Through the dimensioning of the can-shaped gas generator mentioned above a gas generator is created that can be arranged within the chute or the chute housing in a particularly space-saving manner. Here it has been shown that space-saving is the greater the smaller the ratio between the length and the outer diameter of the can-shaped gas generator.

In order to be able to fasten the gas generator to the fastening section or the protective envelope in a particularly simple manner said gas generator in a further particularly advantageous embodiment of the airbag device is fastened to the fastening section or the protective envelope via one of its two ends facing in longitudinal direction. The provision of additional support means on the fastening section, the protective envelope or the gas generator is not mandatorily required with this embodiment, seeing that the gas generator can already be securely and accurately supported on the fastening section or the protective envelope via its face ends, so that the construction of the airbag device in this embodiment is particularly simple.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
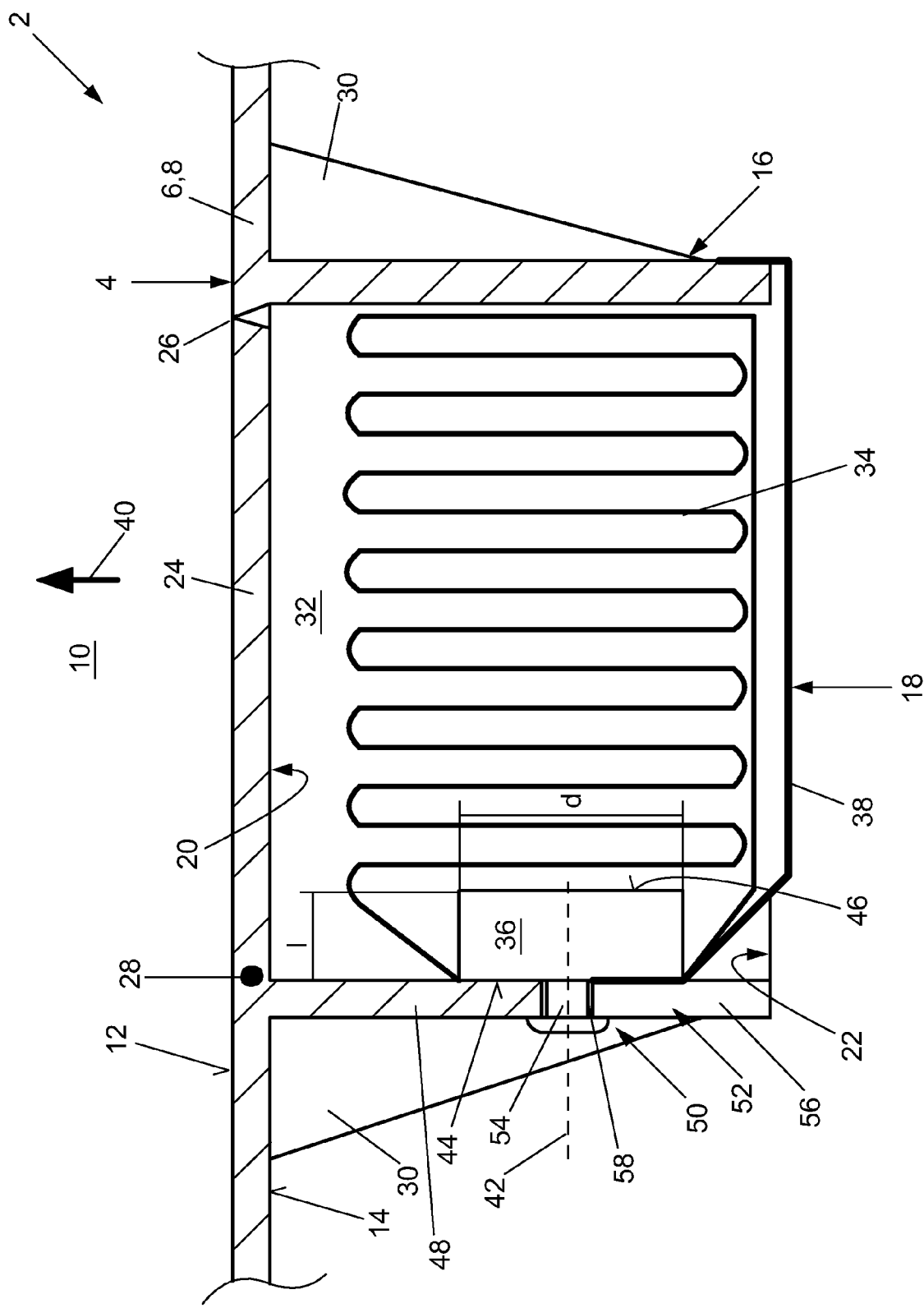
FIG. 1 a lateral view of a first embodiment of the airbag device according to the invention in sectional representation.

FIG. 1 shows a first embodiment of the airbag device 2 according to the invention. The airbag device 2 comprises a carrying part 4 on the motor vehicle end. The carrying part 4 on the motor vehicle end in the embodiment shown is designed as interior trim component 6, more precisely as instrument panel 8, although any carrying part 4 that is suitable for accommodating the forces that occur during the unfolding of the gas bag described in more detail later on is possible.

The carrying part 4 or the interior trim component 6 comprises an outer side 12 facing the vehicle interior 10 and an inner side 14 facing away from the vehicle interior 10. The inner side 14 is followed by a chute housing 16 of the carrying part 4 in which an airbag module 18 is at least partially arranged. The chute housing 16 designed in one piece with the carrying part 4 and consisting of plastic is designed substantially tubular in shape in the first embodiment shown and has an exit opening 20 facing the vehicle interior 10. In addition, the chute housing 16 has a further opening 22 facing away from the vehicle interior 10.

The exit opening 20 for the unfolding gas bag of the airbag module 18 is covered by a cover 24 and thus closes the chute housing 16 to the vehicle interior 10. However, the cover 24, which is designed in one piece with the carrying part 4, at least comprises one predetermined tearing line 26 along which the cover 24 detaches from the carrying part 4 when the gas bag, subject to exerting a suitable tearing force on the predetermined tearing line 26, unfolds. In addition, the cover 24 comprises a predetermined swivel axis 28 about which the cover 24 can be swiveled subject to exposing the exit opening 20, without it detaching from the carrying part 4. As is evident from FIG. 1 support ribs 30 furthermore extend between the inner side 14 of the carrying part 4 and the outer side of the chute housing 16 in order to stiffen or securely support the chute housings 16 on the carrying part 4.

As already mentioned before, the airbag module 18 is at least partially arranged within the chute 32 surrounded by the chute housing 16. Here, the airbag module 18 consists of an inflatable, folded gas bag 34 and a gas generator 36 for inflating the gas bag 34, wherein a separate, rigid and heavy-weight airbag housing is omitted. This has the advantage that the total weight of the airbag device 2 can be kept low.

The airbag module 18 furthermore comprises a flexible protective envelope 38 at least partially enveloping the gas bag 34 or/and the gas generator 36. The flexible protective envelope 38 is fastened to the chute housing 16 or/and to the carrying part 4. In the present example the flexible protective envelope 38 is at least partially fastened to the rim of the chute housing 16 surrounding the opening 22 in such a manner that the opening 22 is closed by the flexible protective envelope 38, and the flexible protective envelope 38 is detachably fastened to the rim of the opening 22 of the chute housing 16. Thus the flexible protective envelope 38 fastened to the chute housing 16 closes the chute housing 16 completely, while the chute 32 is limited in part by the chute housing 16 and in part by the flexible protective envelope 38, so that a closed chute 32 is created whose exit opening 20 is covered by the cover 24 already mentioned before. Here, the tear strength of the protective envelope 38 fastened to the chute housing 16 is greater than the tear strength of the predetermined tearing line 26, so that the predetermined tearing line 26 and not the flexible protective envelope 38 tears during the unfolding of the gas bag 34. In this manner it is ensured that the unfolding of the folded gas bag 34 unfolds through the exit opening 20 in exit direction 40 and not in the opposite direction through the opening 22. As a benefit of the flexible protective envelope 38, the chute housing 16, is no longer needs to be provided with an additional, closing wall in the region of the opening 22, which would substantially increase the weight compared with a flexible protective envelope 38.

The gas generator 36 is designed cylindrically, in the present example can-shaped. Thus, the can-shaped gas generator 36 has a longitudinal axis 42, while the gas generator 36 additionally comprises two face ends 44, 46 facing in opposite longitudinal directions. As is evident from FIG. 1 the length l of the can-shaped gas generator 36 is smaller than its outer diameter d. The length l of the can-shaped gas generator 36 is maximally a third of the outer diameter d in order to make possible a particularly space-saving and variable arrangement of the gas generator 36 within the chute housing 16 or the chute 32. Alternatively, the length l of the can-shaped gas generator 36 should maximally amount to half of the outer diameter d in order to approximately achieve the advantages mentioned before.

The airbag module 18 is fastened to a wall-shaped fastening section 48. Here, the fastening section 48 is designed as part of the chute housing 16 which in turn is designed as one piece with the carrying part 4 so that it can be said that the carrying part 4 comprises the fastening section 48 as well. However, alternatively the chute housing 16 could also be subsequently fastened to the carrying part 4 although the one-piece design is preferable. Here, the airbag module 18 is fastened to the fastening section 48 via a link guide 50.

Figure 3:
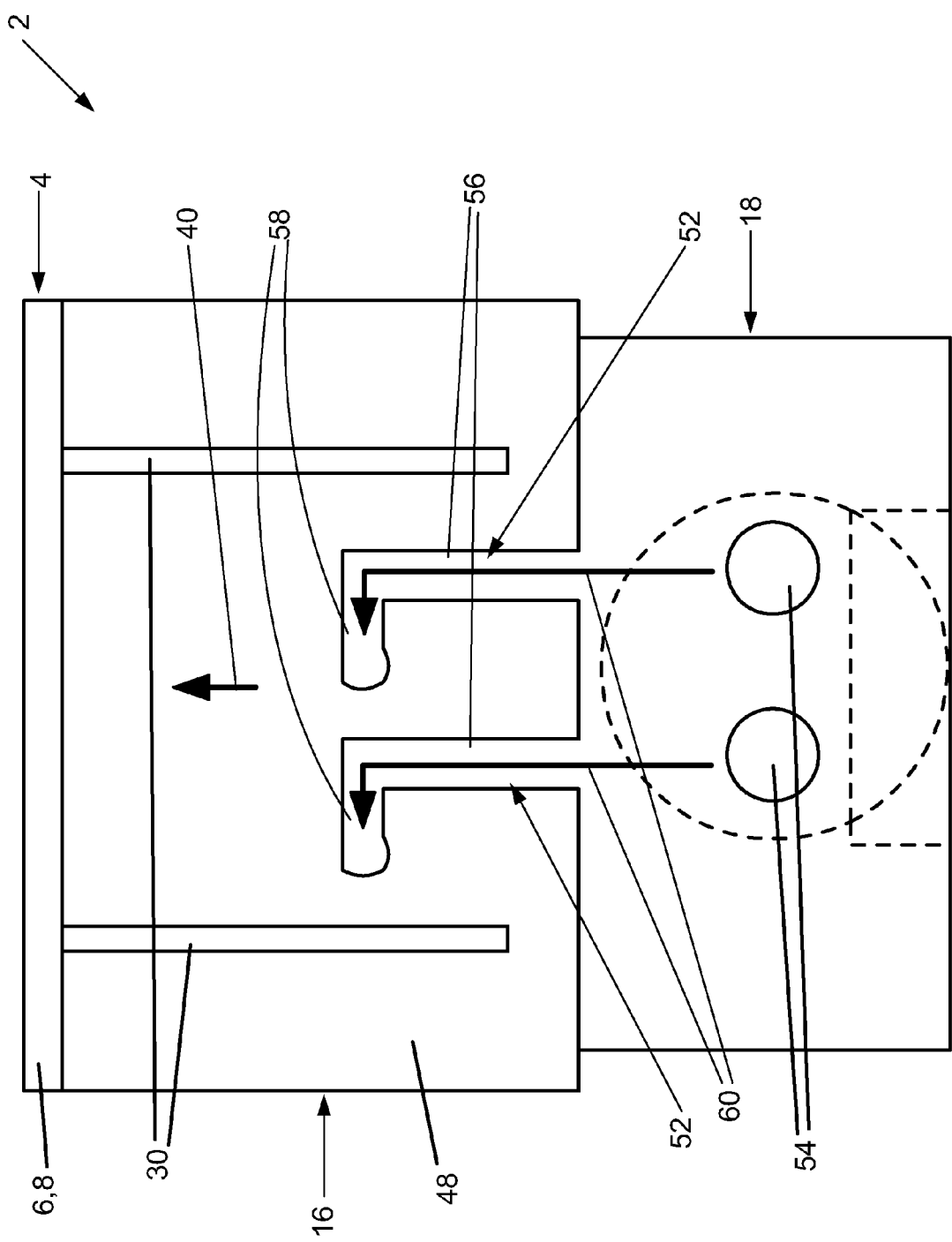
FIG. 3 a view of the airbag devices from FIG. 1 and FIG. 2 in the direction of the arrow A before or during the mounting of the airbag module to the carrying part.

The link guide 50 comprises at least one link 52, and in the present example two links 52 are provided, which are particularly evident in FIG. 3. The links 52 shown in FIG. 3 are of the grooved type in order to simplify the mounting of the airbag module 18 to the fastening section 48, while the links 52 could also be designed groove or web-shaped. On the other hand, the link guide 50 comprises at least one protruding shoulder 54, and in the present example two such protruding shoulders 54 are provided. The protruding shoulder 54 can be inserted in the associated link 52 and positively guided along the link 52. As is evident from FIG. 1 the protruding shoulders 54 are designed mushroom-shaped here so that these engage behind the edge of the respective link 52 and guarantee secure fastening of the airbag module 18 to the fastening section 48. It has proved to be advantageous here if the link 52 is provided on the fastening section 48 and the protruding shoulder 54 on the airbag module 18.

In the shown first embodiment according to FIG. 1 and FIG. 3, the protruding shoulder 54 is provided on the face end 44 of the gas generator 36, while the fastening section 48 comprises the associated link 52. The protruding shoulders 54 are thus directly arranged on the gas generator 36. The link 52 itself has an entry section 56 via which the protruding shoulder 54 can be inserted in the link 52. The entry section 56 of the link 52 extends parallel to the exit direction 40 of the gas bag 34 or/and to the inserting direction of the airbag module 18, and the latter in the present example corresponds to the exit direction 40. Because of this particularly secure introduction of the airbag module 18 in the chute housing 16 is possible. The link 52 furthermore comprises a bag section 58 at its end which directly follows the entry section 56, and the bag section 58 can also follow the entry section 56 indirectly subject to the intermediate placement of a further section of the link 52. Here, the bag section 58 runs at an angle, preferentially transversely, in the present example particularly preferred at a right angle to the entry section 56. Consequently the bag section 58 of the link 52 also runs at a right angle to the exit direction 40 of the gas bag 34, and through this feature it is ensured that the airbag module 18 even on unfolding of the gas bag 34 is particularly securely supported on the fastening section 48. In addition, the mounting of the airbag module 18 to the fastening section 48 is substantially facilitated through this mechanism.

In order to fasten the airbag module 18 to the fastening section 48, the protruding shoulders 54 have to be initially inserted in the entry sections 56 of the links 52 in exit direction 40 in order to subsequently shift the airbag module 18 transversely to the exit direction 40, so that the protruding shoulders 54 enter the associated bag sections 54 of the links 52 as is indicated in FIG. 3 by means of the arrows 60. The gas generator 36 is thus fastened to the fastening section 48 via its face end 44 so that its longitudinal axis 42 extends transversely, in this case at a right angle to the exit direction 40 of the gas bag 34. The special dimensioning of the can-shaped gas generator 36, which was described before, provides the benefit of a particularly space-saving arrangement of the gas generator 36 so that a practical arrangement of the folded, inflatable gas bag 34 within the chute 32 or the chute housing 16 is possible.

Making reference to FIG. 2, a second embodiment of the airbag device 2 according to the invention is described in the following, and the second embodiment substantially corresponds to the first embodiment, so that in the following merely the differences will be discussed, same reference characters are used for same or similar parts and the preceding description of the first embodiment applies accordingly making reference to FIG. 1 and FIG. 3.

With the second embodiment the link guide 50 is not provided on the gas generator 36 on the one hand and the fastening section 48 of the carrying part 4 on the other hand, but on the protective envelope 38 of the airbag module 18 on the one hand and the fastening section 48 of the carrying part 4 on the other hand. Here, the protruding shoulders 54 are provided directly on the protective envelope 38, while the links 52, as already with the first embodiment, are provided on the fastening section 48. Since the flexible protective envelope 38 is designed larger than the gas generator 36, additional fastening sections with corresponding link guides for fastening the flexible protective envelope 38 should be provided in a suitable manner as is exemplarily indicated in FIG. 2 by means of the fastening section 62, which in turn is designed as a part of the chute housing 16 and arranged in transverse direction opposite the fastening section 48.

With this embodiment, the gas generator 36 is now indirectly connected to the fastening sections 48 via the flexible protective envelope 38, as a result of which a particularly flexible and practical arrangement of the gas generator 36 within the chute housing 16 or the chute 32 is possible. Thus, the gas generator 36 is fastened to the flexible protective envelope 38 by screwing in such a manner that the gas generator 36 relative to at least one direction is arranged transversely to the exit direction 40 of the gas bag 34 in the middle within the chute 32 or the chute housing 16. Here, the gas generator 36 is fastened to the flexible protective envelope 38 via its face end 44 facing in longitudinal direction so that its longitudinal axis 42 extends parallel to the exit direction 40 of the gas bag 34.

Figure 2:
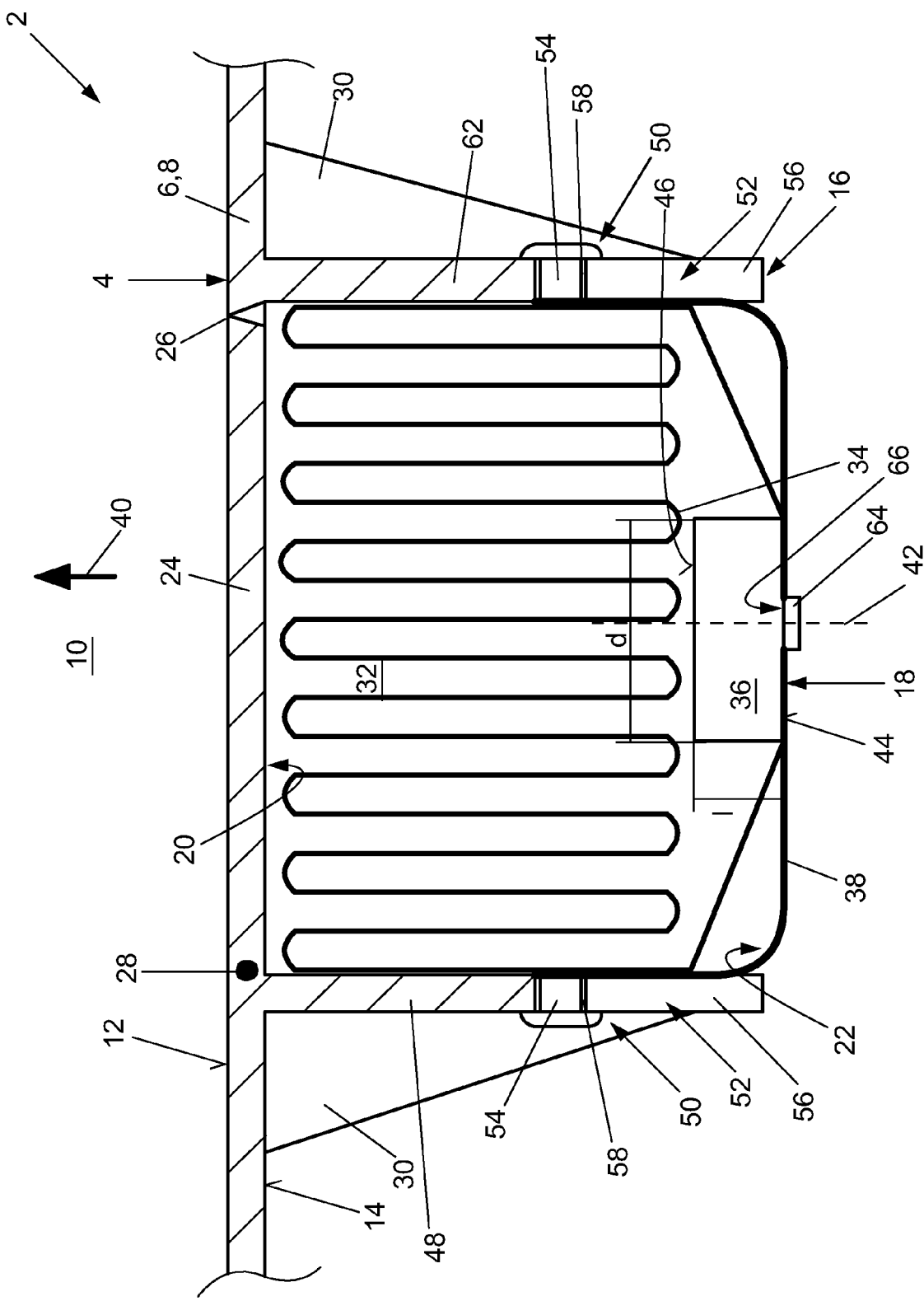
FIG. 2 a lateral view of a second embodiment of the airbag device according to the invention in sectional representation.

As is further evident from FIG. 2, the gas generator 36 on its face end 44, facing the flexible protective envelope 38, comprises a connecting part 64 for connecting an ignition cable. Thus, the ignition cable (not shown) together with the connecting part 64 can form a plug connection that can be produced particularly simply. The connecting part 64 is accessible via a clearance 66 in the flexible protective envelope 38 and the connecting part 64 with the second embodiment extends through the clearance 66 in the flexible protective envelope 38 to the outside, so that a plug connection with the ignition cable can be produced in a particularly simple manner.

Although FIG. 1 and FIG. 3 of the first embodiment do not show a gas generator 36 with a connecting part 64, a corresponding connecting part 64 should also be provided with the first embodiment. In contrast with the second embodiment the connecting part 64 in the first embodiment would then be accessible via a clearance in the fastening section 48 or would extend to the outside through such a clearance in the fastening section 48. With the first embodiment, it would then be particularly advantageous if one of the protruding shoulders 54 simultaneously forms the connecting part in order to achieve a particularly simple construction of the gas generator 36 and the fastening section 48.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An airbag device for a motor vehicle, comprising:
a carrying part on a motor vehicle side;
an airbag module comprising:
at least one inflatable, folded gas bag fastened to the carrying part; and
a gas generator for inflating the folded gas bag;
wherein the carrying part comprises a fastening section to which the airbag module is detachably fastened and a chute housing for forming a chute for an aimed unfolding of the folded gas bag in an exit direction, in which the airbag module is at least partially arranged, and the fastening section is designed as part of the chute housing, wherein the carrying part is designed as an interior trim component in one piece with the chute housing;
wherein the airbag module is fastened to the fastening section via a link guide comprising:
at least one link provided on the fastening section; and
at least one protruding shoulder provided on the airbag module and that can be inserted in the at least one link and positively guided along the at least one link;
wherein the at least one link comprises an entry section via which the at least one protruding shoulder can be inserted in the at least one link and a bag section on an end that follows the entry section, wherein the bag section runs at an angle with respect to the entry section.

2. The airbag device according to claim 1, wherein the at least one protruding shoulder has a mushroom shaped design.

3. The airbag device according to claim 1, wherein the at least one link is a groove.

4. The airbag device according to claim 1, wherein the bag section of the at least one link is adapted to run transversely, wherein the entry section of the at least one link is adapted to run parallel to the exit direction of the folded gas bag or to an inserting direction of the airbag module.

5. The airbag device according to claim 1, wherein the link guide is provided on the gas generator of the airbag module and the fastening section of the carrying part, wherein the protruding shoulder is provided directly on the gas generator and the at least one link and the gas generator comprises a connecting part for connecting an ignition cable that is accessible via a clearance in the fastening section or extends to the outside through the clearance in the fastening section.

6. The airbag device according to claim 1, wherein the airbag module comprises a flexible protective envelope at least partially enveloping the folded gas bag or the gas generator, which is fastened to the chute housing, wherein the chute in part is limited by the chute housing and in part by a protective envelope, so that there is a closed chute.

7. The airbag device according to claim 6, wherein the link guide is provided on the protective envelope of the airbag module and the fastening section of the carrying part, wherein the protruding shoulder is provided directly on the protective envelope and the at least one link is provided on the fastening section.

8. The airbag device according to claim 7, wherein the gas generator is fastened to the protective envelope with a screw, wherein the gas generator comprises a connecting part for connecting an ignition cable that is accessible via a clearance in the protective envelope or extends to an outside through the clearance in the protective envelope.

9. The airbag device according to claim 1, wherein the gas generator relative to at least one direction is arranged transversely to the exit direction of the folded gas bag in the middle within the chute.

10. An airbag device for a motor vehicle, comprising:
a carrying part on a motor vehicle side;
an airbag module comprising:
at least one inflatable, folded gas bag fastened to the carrying part;
a gas generator for inflating the folded gas bag; and
a flexible protective envelope at least partially enveloping the folded gas bag or the gas generator,
wherein the carrying part comprises a fastening section to which the airbag module is detachably fastened and a chute housing for forming a chute for an aimed unfolding of the folded gas bag in an exit direction, in which the airbag module is at least partially arranged, and the fastening section is designed as part of the chute housing, wherein the carrying part is designed as an interior trim component in one piece with the chute housing, and wherein the chute housing comprises an exit opening for unfolding of the folded gas bag that is covered by a cover comprising a predetermined tearing line, wherein the flexible protective envelope is fastened to the chute housing, wherein the chute in part is limited by the chute housing and in part by a protective envelope, so that there is a closed chute a tear strength of the protective envelope fastened to the chute housing is greater than a second tear strength of the predetermined tearing line;
wherein the airbag module is fastened to the fastening section via a link guide comprising:
at least one link provided on the fastening section; and
at least one protruding shoulder provided on the airbag module and that can be inserted in the at least one link and positively guided along the at least one link;
wherein the at least one link comprises an entry section via which the at least one protruding shoulder can be inserted in the at least one link and a bag section on an end that follows the entry section, wherein the bag section runs at an angle with respect to the entry section.

11. An airbag device for a motor vehicle, comprising:
a carrying part on a motor vehicle side;
an airbag module comprising:

at least one inflatable, folded gas bag fastened to the carrying part; and a gas generator for inflating the folded gas bag, wherein the gas generator is designed cylindrically with a longitudinal axis that extends to an exit direction of the folded gas bag and wherein the gas generator relative to at least one direction is arranged transversely to the exit direction of the folded gas bag in the middle within the chute;

wherein the carrying part comprises a fastening section to which the airbag module is detachably fastened and a chute housing for forming a chute for an aimed unfolding of the folded gas bag in the exit direction, in which the airbag module is at least partially arranged, and the fastening section is designed as part of the chute housing, wherein the carrying part is designed as an interior trim component in one piece with the chute housing; and wherein the airbag module is fastened to the fastening section via a link guide comprising:

at least one link provided on the fastening section; and at least one protruding shoulder provided on the airbag module and that can be inserted in the at least one link and positively guided along the at least one link;

wherein the at least one link comprises an entry section via which the at least one protruding shoulder can be inserted in the at least one link and a bag section on an end that follows the entry section, wherein the bag section runs at an angle with respect to the entry section.

12. The airbag device according to claim 11, wherein a length of the gas generator is smaller than an outer diameter (d).

13. The airbag device according to claim 12, wherein the length is a maximum of half of the outer diameter (d).

14. The airbag device according to claim 13, wherein the length is a maximum of a third of the outer diameter (d).

15. The airbag device according to claim 11, wherein the gas generator is fastened to the fastening section or a protective envelope via one of two face ends facing in a longitudinal direction.

* * * * *